(12) United States Patent
Oi et al.

(10) Patent No.: US 8,270,414 B2
(45) Date of Patent: Sep. 18, 2012

(54) APPARATUS AND METHOD TO DYNAMICALLY HANDOVER MASTER FUNCTIONALITY TO ANOTHER PEER IN A WIRELESS NETWORK

(75) Inventors: Emily H. Oi, Portland, OR (US); Marc Meylemans, Beaverton, OR (US); Oren Kaidar, Binvamina (IL)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 12/229,287

(22) Filed: Aug. 20, 2008

(65) Prior Publication Data

US 2010/0046468 A1    Feb. 25, 2010

(51) Int. Cl.
    *H04L 12/28* (2006.01)
(52) U.S. Cl. .................................. 370/400; 370/331
(58) Field of Classification Search .................. 370/331, 370/384, 312, 400, 410; 455/440, 437, 436
    See application file for complete search history.

(56) References Cited

U.S. PATENT DOCUMENTS

| | | | |
|---|---|---|---|
| 6,973,053 B1 * | 12/2005 | Passman et al. | 370/310 |
| 2002/0055978 A1 * | 5/2002 | Joon-Bo et al. | 709/209 |
| 2005/0086273 A1 * | 4/2005 | Loebbert et al. | 707/204 |
| 2007/0104139 A1 | 5/2007 | Marinier et al. | |
| 2007/0280481 A1 * | 12/2007 | Eastlake et al. | 380/277 |
| 2008/0002692 A1 * | 1/2008 | Meylan et al. | 370/390 |
| 2008/0151848 A1 | 6/2008 | Fischer et al. | |
| 2008/0259866 A1 * | 10/2008 | Kostic et al. | 370/329 |

FOREIGN PATENT DOCUMENTS

| | | |
|---|---|---|
| WO | 2010/021853 A2 | 2/2010 |
| WO | 2010/021853 A3 | 5/2010 |

OTHER PUBLICATIONS

International Preliminary Report on Patentability received for PCT Patent Application No. PCT/US2009/053039, mailed on Mar. 3, 2011, 7 pages.
International Search Report/Written Opinion for Patent Application No. PCT/US2009/053039, mailed on Mar. 23, 2010, 12 pages.
Part 15.3: "Wireless medium access control (MAC) and physical layer (PHY) specifications for high rate wireless personal area networks (WPANs)", IEEE Std. 802.15.3-2003, Sep. 29, 2003.
Office action received for European Patent Application No. 09808600.2, mailed on Mar. 29, 2011, 2 pages of European office action.

* cited by examiner

*Primary Examiner* — Anh-Vu H Ly
*Assistant Examiner* — Peter Cheng
(74) *Attorney, Agent, or Firm* — Prass LLP; Ellis B. Ramirez

(57) ABSTRACT

An embodiment of the present invention provides a method of dynamically handing over master functionality from a wireless station configured as a master station to another peer station in a wireless network, comprising, discovering the peer station's Master/AP capability, which may be, but is not required to be, via a (Re)Association request, selecting the peer station to be a new master station based on predetermined parameters, passing the basic service set (BSS) context from the master station to the new master station in a master station Role Request message before transitioning, notifying the new master station to activate its master station role via the master station Role Request message, and switching by the client station to the role of new master station upon receipt of an AP Role Activation message and starting to send Beacons with a BSSID that is the same as used in Beacons of the previous master station.

17 Claims, 2 Drawing Sheets

APPARATUS AND METHOD TO DYNAMICALLY HANDOVER MASTER FUNCTIONALITY TO ANOTHER PEER IN A WIRELESS NETWORK

BACKGROUND

Although not limited in this respect, wireless fidelity (Wi-Fi) Peer-to-Peer networking, Wi-Fi PAN and Mesh are emerging as important extensions to the Institute for Electronic and Electrical Engineers (IEEE) 802.11 standard for wireless networking. These types of networks have one important difference compared to an infrastructure-based (BSS) WLAN network; they are very mobile, can be created anywhere on the fly and can be very volatile (peers coming and leaving). With these kinds of ad hoc networks, one wireless peer is usually acting as the Master while the other peers are acting as Slave devices. In a Wi-Fi PAN network e.g. the Master will be a device that acts as an Access Point (software-based AP or SoftAP) and the Slaves will be regular stations (STAs).

When a wireless device supports both the access point (AP) and wireless station (STA) functionality, it could change modes on a need basis. If it is the first device in the personal area network (PAN) establishment, it will act as an AP—if it is joining an already existing PAN it will act as a STA. In effect, you will have one AP (Master) and one or more STAs (Slaves) in a Wi-Fi PAN. The problem starts when the AP (Master) wants to leave the PAN. When the AP leaves the PAN formation, the PAN will stop to exist unless one of the peers (Slaves) can switch over to AP mode and become the Master device of this PAN.

Thus, a strong need exists for an apparatus and method to dynamically handover master functionality to another peer in a wireless network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
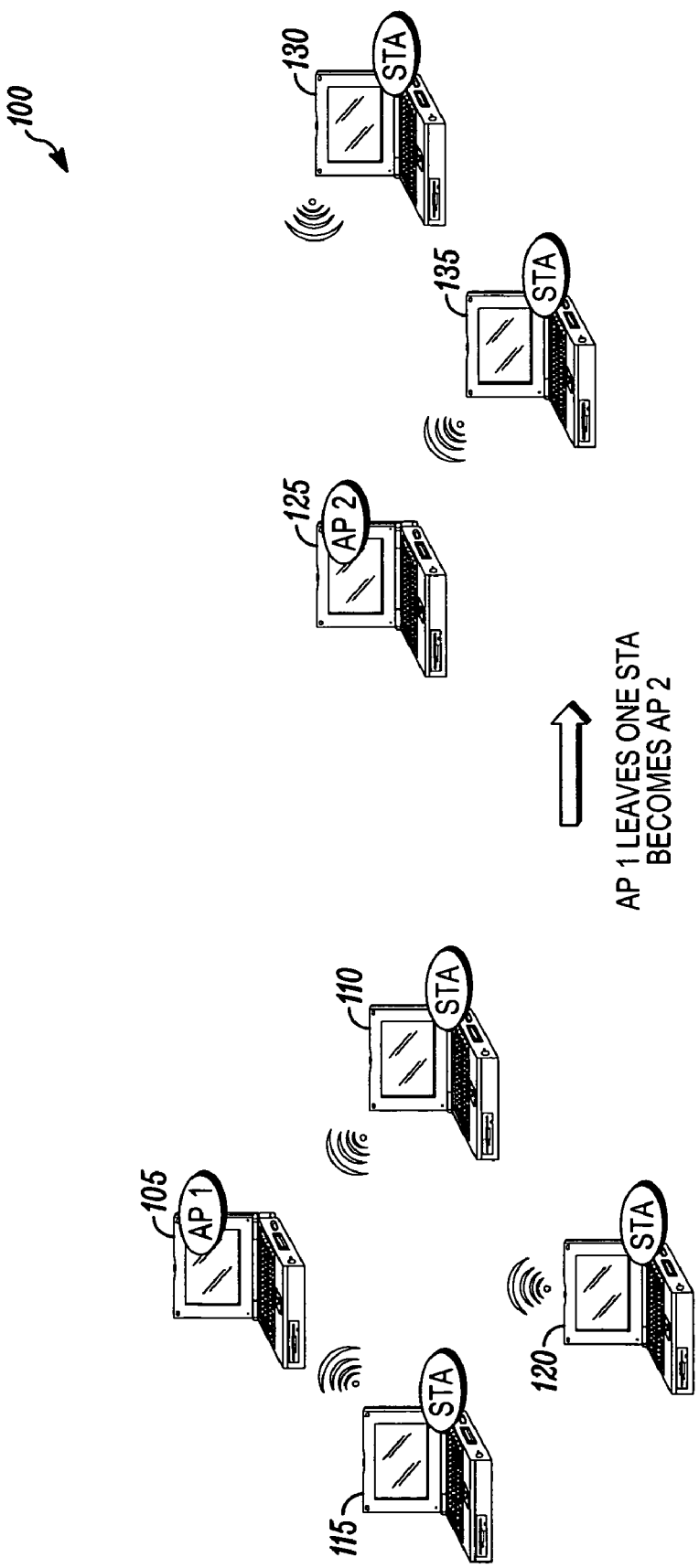
FIG. 1 illustrates Dynamic Switching of Master Functionality in a wireless PAN of an embodiment of the invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a virtual basic service set (BSS) method to assign master functionality with the same BSSID to a peer device acting as a slave previously. In an embodiment of the present invention, the virtual BSS method accelerates the master handover process by eliminating the scanning phase and association/authentication phase process. A mechanism of the present invention allows seamless handovers between masters in a wireless PAN-type network without requiring any changes at the non-master capable client side.

Turning now to FIG. 1 is shown the virtual basic service set (BSS) 100 method to assign Master functionality with the same BSSID to a peer device acting as a slave with API 105 and peer devices 110, 115 and 120. This capability provides session continuity in an ad hoc type network (master-slave type network) when the Master device 105 has to leave the network. The Master device 105 knows or can request the peers' capabilities and assign one of the other peers (slaves) 125, 130 and 135 to become the new master 125 with the same BSSID. In order for a wireless device to play either the master or slave role, it needs to be capable to be an AP (SoftAP) and a regular STA. The proposed mechanism allows seamless handovers between masters in a wireless PAN-type network without requiring any change at the client side. Further, an embodiment of the present invention allows a STA device to take over the role of master of the PAN if the original master (AP) needs to leave the network.

Figure 2:
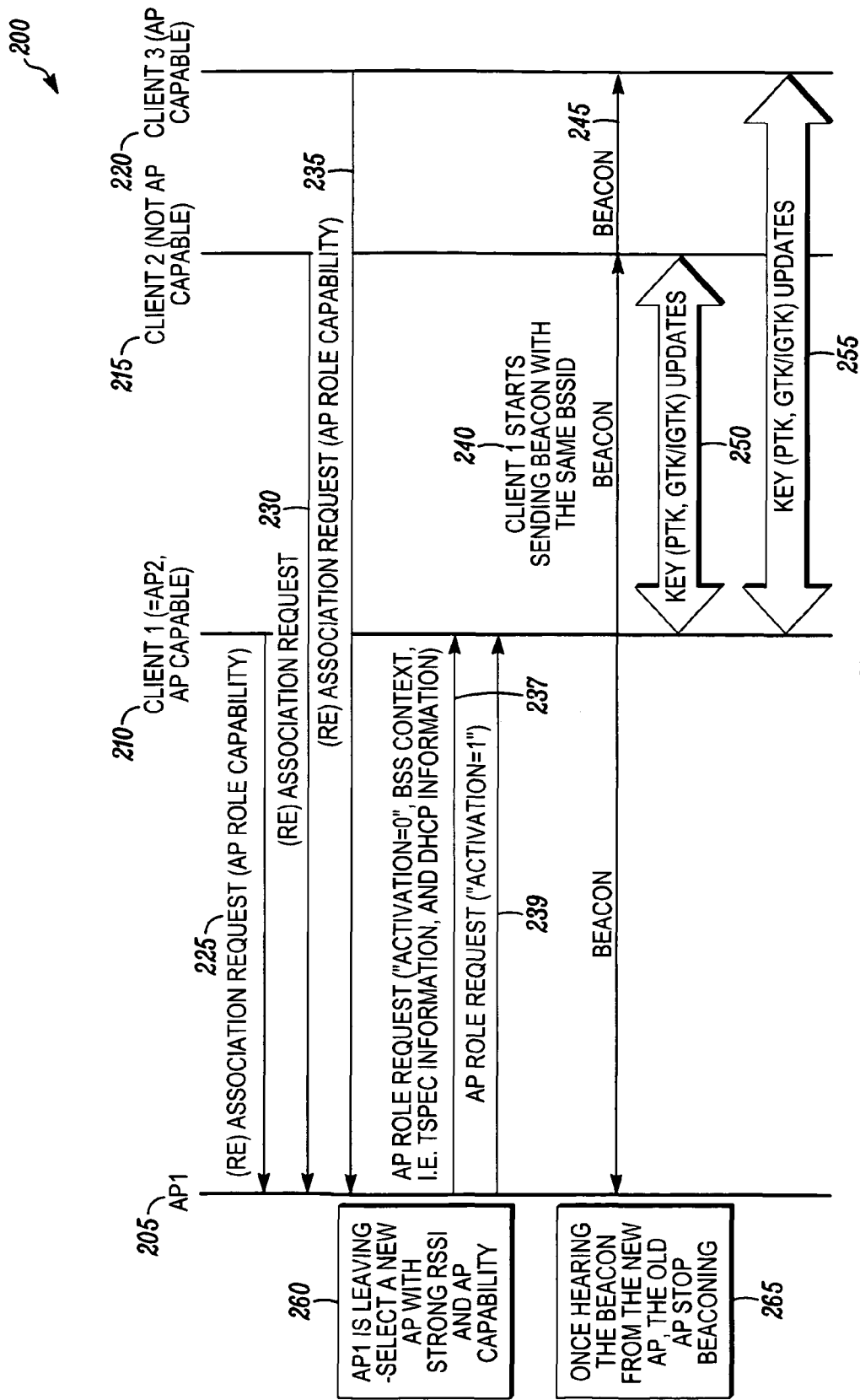
FIG. 2 shows the Procedure and Message Exchange for Dynamic Master Functionality Transition an embodiment of the invention.

Illustrated in FIG. 2, shown generally as 200, is an embodiment of the present invention which may provide the components (AP 1 205, client 1 210, client 2 215 and client 3 220) and procedures as follows:

Phase 1: Discovery:

1.1 As part of the clients' connection establishment to the AP (API), the clients will indicate their Master/AP capability in the (Re)Association Request (client 1 request 225, client 2 request 230 and client 3 request 235); although it is understood that the present invention is not limited in this respect and the advertising of the AP Role Capability could be done in any number of ways and using the (Re)Association Request is but one example.

Phase 2: AP Selection 2.1 The current AP shall select the new AP based on various parameters, such as signal strength 260.

2.2 The current AP shall pass the BSS context such as the DHCP information and Block ACK TSPEC in an AP Role Request message 237 before transitioning (Activation bit is set to 0) or when transitioning (Activation bit is set to 1).

2.3 The current AP will notify the candidate AP to activate its AP role via AP Role Request message by setting the "Activation" bit to 1 239.

Phase 3: AP Transition 3.1 Upon receipt of AP Role Activation message, the AP candidate switches to AP mode, and starts to send Beacons with the same BSSID as used in the Beacons of the previous AP 245. Once hearing the beacon from the new AP, the old AP stops beaconing 265. The new AP will not change its RA (Receiver Address), and shall be able to receive packets in which the BSSID does not match the RA for the new AP.

3.1.1 The New AP may detect that the old AP has left the BSS, and may assume the role of the AP by itself.

3.2 The new AP will issue a key update message 250 and 255 to refresh the PTK and GTK/IGTK with all clients by using the same PSK that was used by the previous AP. Since the new AP uses the same BSSID as the previous AP, association and authentication is not required. The clients won't notice any transitions except PTK and GTK/IGTK key updates.

The following illustrates an AP Role Request frame formats:

| | Category | Action (AP Role Request) | Activation (0 or 1) | TSPEC information (optional) | DHCP information (optional) |
|---|---|---|---|---|---|
| Octets: | 1 | 1 | 1 | variable | Variable |

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a wireless station (STA) configured to operate as a master station in a wireless network and to transfer master station functionality to a client station when leaving said wireless network by:
receiving an association request from a client station wishing to join the wireless network, wherein the association request comprises a Master/AP capability;
discovering from the association request at least one client station with Master/AP capability;
selecting said discovered at least one client station to be a new master station based on predetermined parameters;
passing the basic service set (BSS) context from said master station to said new master station in a master station Role Request message before transitioning;
notifying said new master station to activate its master station role via said master station Role Request message; and
switching by said client station to the role of new master station upon receipt of an AP Role Activation message and starting to send Beacons with a BSSID that is the same as used in Beacons of said previous master station;
wherein said new master station issues a key update message to refresh the PTK and GTK/IGTK with all clients by using the same PSK that was used by said master station;
wherein said BSS context information is DHCP information and Block ACK TSPEC.

2. The apparatus of claim 1, wherein said new master station is configured to detect that said master station has left said BSS and assumes the role of master station by itself and wherein said discovering said client station's Master/AP capability is via a association request.

3. The apparatus of claim 1, wherein said master station and said new master station are configured to operate as an Access Point (AP).

4. The apparatus of claim 1, wherein said association request is part of said clients' connection establishment to said master station.

5. The apparatus of claim 1, wherein said predetermined parameters is signal strength.

6. The apparatus of claim 1, wherein said notifying said new master station to activate its master station role via master station Role Request message is accomplished by setting an "Activation" bit to 1.

7. The apparatus of claim 1, wherein said new master station will not change its receiver address (RA) and shall be able to receive packets in which the BSSID does not match said RA for said new master station.

8. A method of dynamically handing over master functionality from a wireless station configured as a master station to another peer station in a wireless network, comprising:
receiving an association request from a peer station wishing to join the wireless network, wherein the association request comprises a Master/AP capability;
discovering from the association request at least one peer station with Master/AP capability;
selecting said discovered at least one peer station to be a new master station based on predetermined parameters;
passing the basic service set (BSS) context from said master station to said new master station in a master station Role Request message before transitioning;
notifying said new master station to activate its master station role via said master station Role Request message;
switching by said peer station to the role of new master station upon receipt of an AP Role Activation message and starting to send Beacons with a BSSID that is the same as used in Beacons of said previous master station; and
issuing by said new master station a key update message to refresh the PTK and GTK/IGTK with all peer stations by using the same PSK that was used by said master station;
wherein said BSS context information is DHCP information and Block ACK TSPEC.

9. The method of claim 8, further comprising configuring said new master station to detect that said master station has left said BSS and assuming the role of master station by itself and discovering said peer station's Master/AP capability via an association request.

10. The method of claim 8, further comprising configuring said master station and said new master station to operate as an Access Point (AP).

11. The method of claim 8, wherein said association request is part of said clients' connection establishment to said master station.

12. The method of claim 8, wherein said predetermined parameters is signal strength.

13. The method of claim 8, further comprising setting an Activation bit to 1 to accomplish notifying said new master station to activate its master station role via said master station Role Request message.

14. The method of claim 8, wherein said new master station will not change its receiver address (RA) and shall be able to receive packets in which the BSSID does not match said RA for said new master station.

15. A non-transitory machine-accessible medium that embodies instructions, which when executed by a machine, cause the machine to perform operations comprising:
dynamically handing over master functionality from a wireless station configured as a master station to another peer station in a wireless network by discovering said peer station's Master/AP capability received in an (re) association request when it joined the wireless network; selecting said peer station to be a new master station based on predetermined parameters; passing the basic service set (BSS) context from said master station to said new master station in a master station Role Request message before transitioning; notifying said new master station to activate its master station role via said master station Role Request message; switching by said peer station to the role of new master station upon receipt of an AP Role Activation message and starting to send Beacons with a BSSID that is the same as used in Beacons of said previous master station; and issuing by said new master station a key update message to refresh the PTK and GTK/IGTK with all peer stations by using the same PSK that was used by said master station; wherein said BSS context is DHCP information and Block ACK TSPEC.

16. The non-transitory machine-accessible medium of claim 15, further comprising said instructions causing said machine to perform operations further comprising configuring said new master station to detect that said master station has left said BSS and assuming the role of master station by itself.

17. The non-transitory machine-accessible medium of claim 15, further comprising said instructions causing said machine to perform operations further comprising configuring said master station and said new master station to operate as an Access Point (AP).

* * * * *